US008675126B2

(12) United States Patent
Komada et al.

(10) Patent No.: US 8,675,126 B2
(45) Date of Patent: Mar. 18, 2014

(54) PHOTOGRAPHING APPARATUS AND METHOD OF REMOVING FOREIGN SUBSTANCE

(75) Inventors: Jun Komada, Yokohama (JP); Yasuhiro Morimoto, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 12/616,244

(22) Filed: Nov. 11, 2009

(65) Prior Publication Data

US 2010/0123786 A1    May 20, 2010

(30) Foreign Application Priority Data

Nov. 14, 2008  (JP) ................................. 2008-292515

(51) Int. Cl.
  *H04N 5/225*  (2006.01)
  *B60R 1/06*  (2006.01)
(52) U.S. Cl.
  USPC ......................................... 348/374; 359/507
(58) Field of Classification Search
  USPC ........................................................ 348/374
  See application file for complete search history.

(56) References Cited

U.S. PATENT DOCUMENTS

| 7,324,149 | B2* | 1/2008 | Takizawa et al. | 348/340 |
|---|---|---|---|---|
| 7,339,623 | B2* | 3/2008 | Kawai | 348/340 |
| 7,580,628 | B2* | 8/2009 | Ide et al. | 396/429 |
| 7,639,301 | B2* | 12/2009 | Niwamae et al. | 348/335 |
| 7,719,612 | B2* | 5/2010 | Kaihara et al. | 348/374 |
| 7,724,299 | B2* | 5/2010 | Kawai | 348/340 |
| 8,049,807 | B2* | 11/2011 | Kawai | 348/340 |
| 8,063,973 | B2* | 11/2011 | Niwamae | 348/335 |
| 8,075,143 | B2* | 12/2011 | Fujimoto | 359/507 |
| 8,085,336 | B2* | 12/2011 | Urakami et al. | 348/340 |
| 8,136,952 | B2* | 3/2012 | Kashiyama | 359/507 |
| 8,269,877 | B2* | 9/2012 | Kitaoka | 348/335 |
| 8,289,617 | B2* | 10/2012 | Yamada et al. | 359/359 |
| 2008/0079812 | A1 | 4/2008 | Yamamoto | |
| 2008/0226285 | A1 | 9/2008 | Matsumoto | |
| 2008/0259200 | A1 | 10/2008 | Matsumoto | |
| 2009/0153966 | A1 | 6/2009 | Matsumoto | |
| 2009/0225214 | A1* | 9/2009 | Takizawa | 348/335 |

FOREIGN PATENT DOCUMENTS

| JP | 2004-048665 A | 2/2004 |
|---|---|---|
| JP | 3727903 B2 | 10/2005 |
| JP | 2007-267189 A | 10/2007 |
| JP | 2008-003165 A | 1/2008 |
| JP | 2008-003166 A | 1/2008 |
| JP | 2008-092306 A | 4/2008 |
| JP | 2008-205619 A | 9/2008 |
| JP | 2009-135910 A | 6/2009 |
| KR | 1020080083579 A | 9/2008 |

OTHER PUBLICATIONS

Office Action established for JP2008-292515 (Jul. 24, 2012).
Office Action established for JP2008-292515 (Nov. 13, 2012).
Office Action established for JP2008-292515 (Apr. 23, 2013).

* cited by examiner

*Primary Examiner* — Ngoc-Yen Vu
(74) *Attorney, Agent, or Firm* — Drinker Biddle & Reath LLP (57) ABSTRACT

Provided are a photographing apparatus and a method of removing foreign substances. The photographing apparatus includes an imaging device for converting a captured image into an electrical signal; a vibration member mounted at an imaging plane side of the imaging device; a vibration-applying unit for vibrating the vibration member; and a vibration control unit inputting at least two different control signals such that input times of the at least two control signals are overlapped.

9 Claims, 12 Drawing Sheets

← 57.544kHz

← 57.544kHz

FIG. 6B

← 57.544kHz

← 57.544kHz

PHOTOGRAPHING APPARATUS AND METHOD OF REMOVING FOREIGN SUBSTANCE

CROSS-REFERENCE TO RELATED PATENT APPLICATION

This application claims the benefit of Japanese Patent Application No. 2008-292515, filed on Nov. 14, 2008, in the Japanese Intellectual Property Office, the disclosure of which is incorporated herein in its entirety by reference.

BACKGROUND

The present invention relates to a photographing apparatus and a method of removing foreign substances, and more particularly, to a photographing apparatus including a foreign substance-removing unit for preventing foreign substances from being attached to an imaging device, and a method of removing foreign substances.

Recently, photographing apparatuses such as digital still cameras or video cameras have been widely supplied.

The photographing apparatuses are now capable of providing high quality images due to imaging devices such as a charge-coupled device (CCD) having a large number of pixels. Also, recently, a lens interchangeable photographing apparatus, in which a single-lens reflex finder is detachably mounted on a main body of the lens interchangeable photographing apparatus so that a user can select an optical system (lens) according to necessity, has been widely supplied.

When a lens is separated from the main body of a lens interchangeable photographing apparatus, foreign substances floating in the air may penetrate into the main body of the lens interchangeable photographing apparatus. Also, instruments such as a shutter and an iris that mechanically operate are included inside the main body of the photographing apparatus, and as the instruments operate, foreign substances may be generated.

Therefore, a foreign substance-removing unit that prevents attachment of foreign substances to an imaging device is installed on an imaging plane side of the imaging device of a photographing apparatus. In general, the foreign substance-removing unit has a structure in which a vibration member is vibrated using a piezoelectric element.

The foreign substance-removing unit vibrates the vibration member at a resonance frequency of the vibration member in order to generate sufficient vibration for removing foreign substances. Since the resonance frequency is a standing wave, dust is not removed in nodes of the vibration member, which are hardly shifted during the vibration of the vibration member.

To address this problem, a device for vibrating a vibration member at two or more resonance frequencies has been disclosed in Japanese Patent No. 3727903, or a controlling method for vibrating a vibration member while sequentially changing a frequency by sweeping the frequency in order to, with certainty, vibrate the vibration member at a resonance frequency has been disclosed in Japanese Patent Laid-Open Gazette No. 2004-48665.

Also, in Japanese Patent Laid-Open Gazette No. 2008-3165, a method, in which a vibration member is vibrated at a frequency band including a first resonance frequency and then at another frequency band including a second resonance frequency that is not continuous to the first resonance frequency, is disclosed.

However, in the inventions disclosed in Japanese Patent No. 3727903, Japanese Patent Laid-Open Gazette No. 2004-48665, or Japanese Patent Laid-Open Gazette No. 2008-3165, the vibration member is sequentially vibrated at a plurality of resonance frequencies, and thus it takes a lot of time to perform an operation of removing foreign substances by vibrating the vibration member at all of the resonance frequencies.

Also, in the method disclosed in Japanese Patent Laid-Open Gazette No. 2004-48665, in which a vibration member is vibrated while sequentially changing a frequency by sweeping the frequency, the vibration member is hardly vibrated at points other than a resonance point of a piezoelectric element. Moreover, even though the foreign substances are hardly removed at the above points other than the resonance point of a piezoelectric element, the vibration member continues to vibrate, thereby wasting power.

SUMMARY

The present invention provides a photographing apparatus that is capable of efficiently removing foreign substances that are attached to a vibration member, and a method of removing foreign substances.

According to an aspect of the present invention, there is provided a photographing apparatus comprising: an imaging device comprising a converter having an output at which an electrical signal of a captured image is provided; a vibration member mounted at an imaging plane side of the imaging device; a vibration-applying unit for vibrating the vibration member, the vibration-applying unit comprising an input; and; and a vibration control unit having an output that provides at least two different control signals to the input of the vibration-applying unit such that input times of the control signals are overlapped.

The vibration member is vibrated by the vibration-applying unit which is vibrated according to input of a control signal. At least two different control signals are input to the vibration-applying unit such that the input of each control signal overlaps, thereby applying vibration of each of the control signals to the vibration member, and vibrating the vibration member while a plurality of vibrations are synthesized. Accordingly, the vibration member may be efficiently vibrated.

The vibration-applying unit may comprise at least two vibration-applying members, and the vibration control unit may input the different control signals to the at least two vibration-applying members, respectively.

The vibration control unit may input a periodic signal as the at least two control signals to the vibration-applying unit.

The vibration control unit may input to the vibration-applying unit a resonance frequency signal that resonantly vibrates the vibration member, as the at least two control signals.

The vibration control unit may input a plurality of control signals to the vibration-applying unit, wherein portions having small vibration displacements among vibration portions of the vibration member caused by each of the control signals do not overlap. The plurality of control signals to be input to the vibration-applying unit may be selected such that portions having small vibration displacements caused by each of the control signals do not overlap.

The vibration control unit may input to the vibration-applying unit a synthesized signal generated by combining at least two different control signals.

The vibration-applying unit may be formed of one vibration-applying member.

According to another aspect of the present invention, there is provided a method of removing foreign substances of a photographing apparatus, wherein a vibration-applying unit vibrates a vibration member that is disposed at an imaging plane side of an imaging device for converting a captured image into an electrical signal, and at least two control signals are input to the vibration-applying unit such that input times of the at least two control signals are overlapped.

The vibration-applying unit may comprise at least two vibration-applying members, and the different control signals are input to the at least two vibration-applying members, respectively.

A synthesized signal may be generated by combining the at least two different control signals, and the generated synthesized signal may be input to the vibration-applying unit.

According to the photographing apparatus and the method of removing foreign substances, foreign substances attached to the vibration member can be efficiently removed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

The present invention will now be described more fully with reference to the accompanying drawings, in which exemplary embodiments of the invention are shown. Like reference numerals in the drawings denote like elements, and thus their description will be omitted.

First Embodiment of the Present Invention

Figure 1:
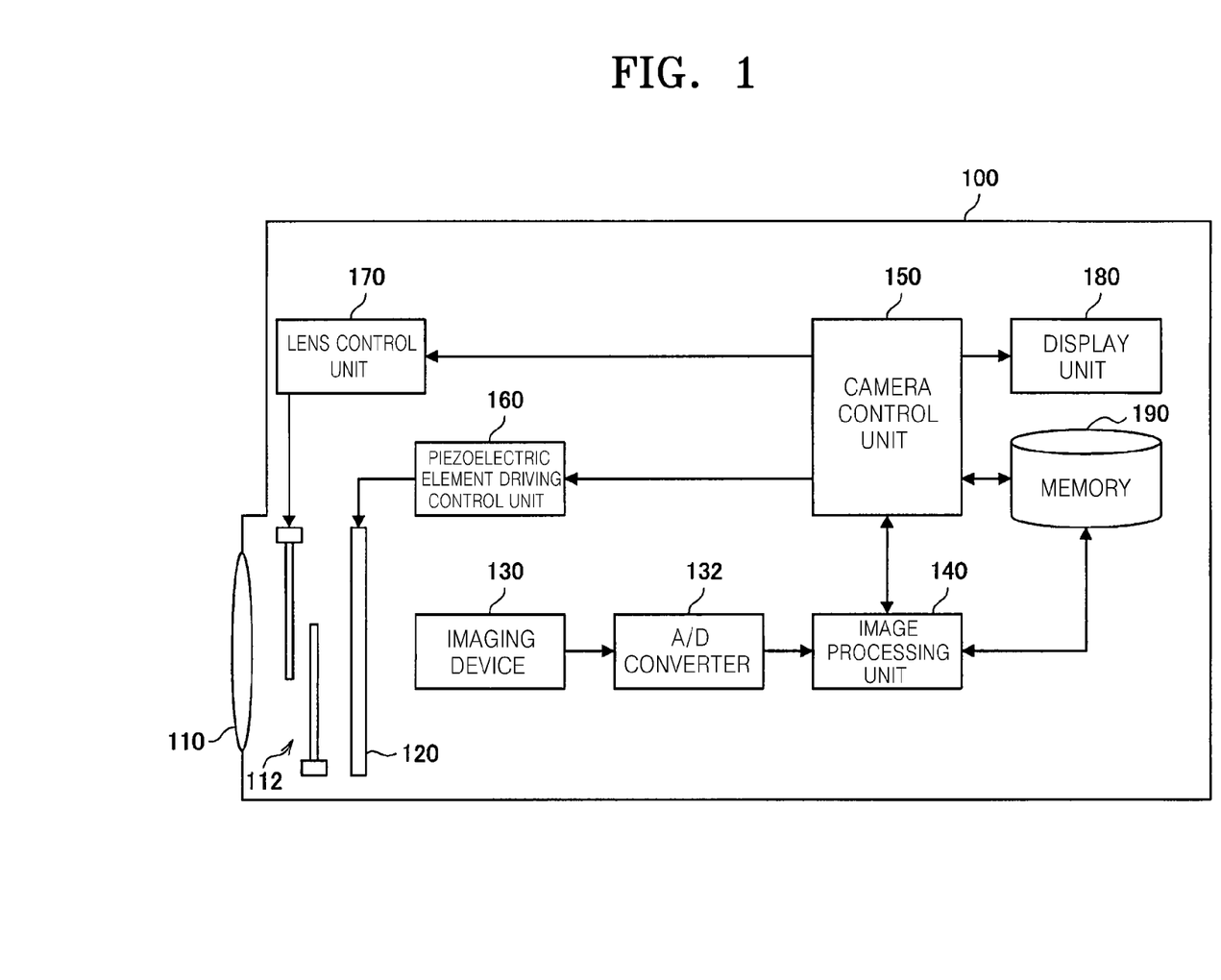
FIG. 1 is a block diagram illustrating the configuration of a photographing apparatus according to an embodiment of the present invention.
Figure 2:
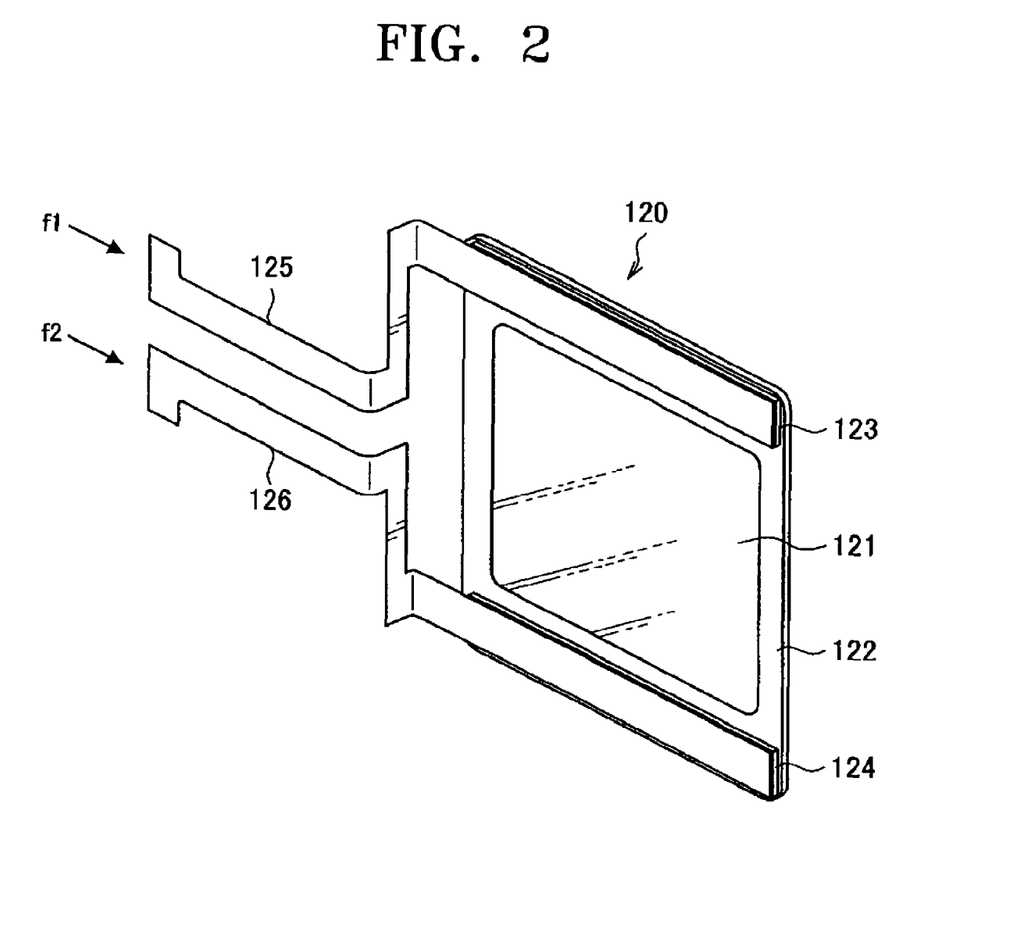
FIG. 2 is a perspective view of a foreign substance-removing unit of the photographing apparatus of FIG. 1, according to an embodiment of the present invention.

A photographing apparatus according to an embodiment of the present invention will be described with reference to FIGS. 1 and 2. FIG. 1 is a block diagram illustrating a photographing apparatus 100 according to an embodiment of the present invention. FIG. 2 is a perspective view illustrating a foreign substance-removing unit 120 of the photographing apparatus 100 of FIG. 1, according to an embodiment of the present invention.

Configuration of the Photographing Apparatus

Referring to FIG. 1, the photographing apparatus 100 includes a lens 110, a foreign substance-removing unit 120, an imaging device 130, an image processing unit 140, a camera control unit 150, a piezoelectric element driving control unit 160, a lens control unit 170, a display unit 180, and a memory 190.

The lens 110 is an optical element for forming a subject image on the imaging device 130. A shutter unit 112 for adjusting an amount of light transmitted to the imaging device 130 is disposed between the lens 110 and the imaging device 130.

The foreign substance-removing unit 120 is installed at an imaging plane side of the imaging device 130. The foreign substance-removing unit 120 prevents foreign substances from attaching to the imaging device 130, and at the same time, removes foreign substances attached to the foreign substance-removing unit 120. Referring to FIG. 2, the foreign substance-removing unit 120 includes a vibration member 121, a supporting unit 122, piezoelectric elements 123 and 124, and flexible printed circuits (FPC) 125 and 126.

The vibration member 121 may be a dust removal filter formed of a transparent material that transmits light such as glass. The vibration member 121 is a square-shaped planar member, which is supported by the supporting unit 122.

According to the current embodiment of the present invention, the vibration member 121 is supported by the supporting unit 122, but the present invention is not limited thereto. That is, the supporting unit 122 may be omitted, and the piezoelectric elements 123 and 124 may be directly mounted on the vibration member 121.

The piezoelectric elements 123 and 124 are vibration-applying members of a vibration-applying unit. That is, the piezoelectric elements 123 and 124 are vibration-applying units that extend or contract according to an applied control signal, and may be formed of, for example, lead-zirconate-titanate (PZT) devices. The piezoelectric elements 123 and 124 are mounted at a pair of sides of the supporting unit 122, which is a square-shaped frame member, facing each other.

Also, the position of the piezoelectric elements 123 and 124 is not limited thereto; for example, the piezoelectric elements 123 and 124 may be mounted to perpendicularly cross each other or on edges of the vibration member 121. The piezoelectric elements 123 and 124 are respectively connected to the FPCs 125 and 126 and extend or contract according to a control signal transmitted from the FPCs 125 and 126. Accordingly, the vibration member 121 that is connected to the piezoelectric elements 123 and 124 via the supporting unit 122 is vibrated.

The FPC 125 and 126 are printed circuit boards in which circuits for transmitting control signals input to the piezoelectric elements 123 and 124 are formed. A periodic control signal of a frequency f1 is input from the FPC 125 to the piezoelectric element 123, and a periodic control signal of a frequency f2 is input from the FPC 126 to the piezoelectric element 124. As described above, in the foreign substance-removing unit 120 according to the current embodiment of the present invention, periodic control signals of different frequencies, the frequencies f1 and f2, are respectively input to the piezoelectric elements 123 and 124 that vibrate the vibration member 121.

Referring to FIG. 1 again, the imaging device 130 is a photoelectric converter that photoelectrically converts a subject image. An analog signal that was photoelectrically converted in the imaging device 130 is output to an analog-to-digital (A/D) converter 132. The A/D converter 132 converts an analog signal transmitted from the imaging device 130 into a digital signal and outputs the digital signal to the image processing unit 140.

The image processing unit 140 performs image processing on image data that is converted into a digital signal. The image processing unit 140 performs image data processing such as white balance adjustment, RGB development, compression coding, etc., according to control data transmitted from the camera control unit 150 and outputs the processed image data to the camera control unit 150. Also, the image processing unit 140 writes image data to the memory 190 or reads the image data from the memory 190.

The camera control unit 150 is a control unit for controlling each functional unit of the photographing apparatus 100. For example, the camera control unit 150 may be a central processing unit (CPU) or a digital signal processor (DSP). The camera control unit 150 outputs to the piezoelectric element driving control unit 160 an instruction to start removing foreign substances, and outputs to the lens control unit 170 a control instruction to control the lens position or the opening degree of an iris.

Also, the camera control unit 150 outputs control data to the image processing unit 140 so that the image processing unit 140 performs image processing on image data, and receives the processed image data from the image processing unit 140. Also, the camera control unit 150 may obtain image data that is stored in the memory 190. The camera control unit 150 may control the image data obtained from the image processing unit 140 or the memory 190 to be displayed on the display unit 180.

The piezoelectric element driving control unit 160 is a control unit for controlling the operation of the foreign substance-removing unit 120. The piezoelectric element driving control unit 160 inputs a control signal to the piezoelectric elements 123 and 124 of the foreign substance-removing unit 120 according to control instructions transmitted from the camera control unit 150.

Since the piezoelectric element driving control unit 160 vibrates the vibration member 121 by inputting control signals to the piezoelectric elements 123 and 124 via the FPCs 125 and 126, the piezoelectric element driving control unit 160 conducts as a vibration control unit.

The lens control unit 170 is a control unit for controlling a lens system of the photographing apparatus 100. The lens control unit 170 controls the lens position or the opening degree of an iris according to a control signal transmitted from the camera control unit 150.

The display unit 180 displays image data, and may be a liquid crystal display (LCD) or an organic light emitting diode (OLED) display. The display unit 180 displays to the user image data input by the camera control unit 150.

The memory 190 is a storage unit that stores image data of an image captured using the photographing apparatus 100 or information required to perform functions of the photographing apparatus 100.

Image data before image processing is performed thereto, or image data after image processing is performed thereto, or compression data is stored in the memory 190. The memory 190 may be a dynamic random access memory (DRAM) or a flash memory. Also, the photographing apparatus 100 may include a removable storage medium (not shown) such as a memory card.

The configuration of the photographing apparatus 100 according to the current embodiment of the present invention has been described above. In the photographing apparatus 100, two different control signals are respectively input to the piezoelectric elements 123 and 124 of the foreign substance-removing unit 120, and thus the vibration member 121 can be effectively vibrated and a high removal ratio of foreign substances is obtained.

Figure 3:
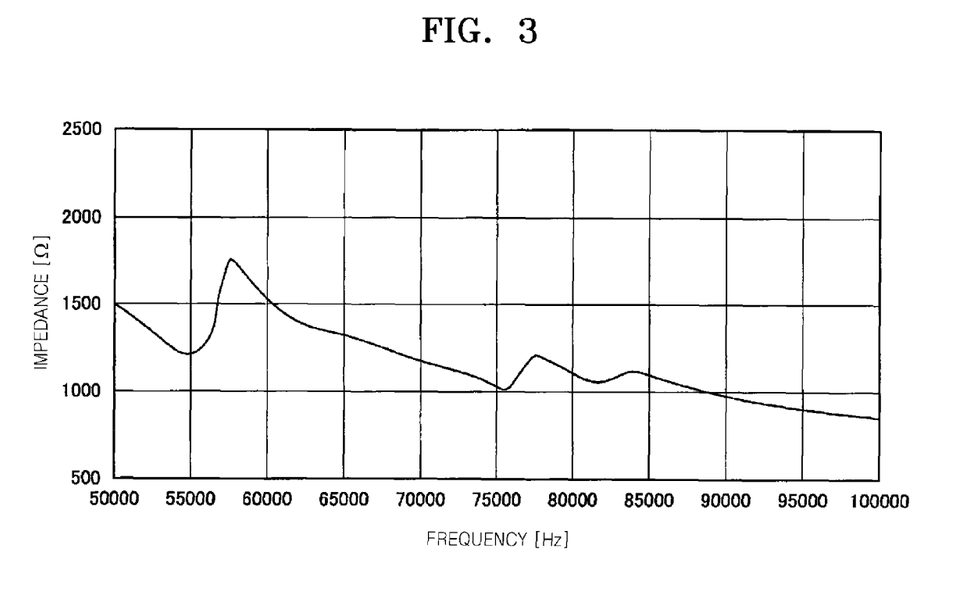
FIG. 3 is a graph showing a relationship between a frequency of a control signal for vibrating a piezoelectric element and impedance.
Figure 4A:
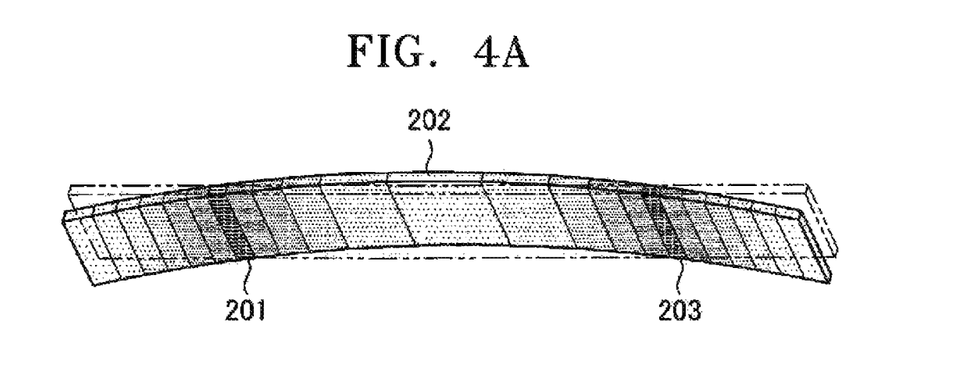
FIG. 4A is a pictorial diagram illustrating an exemplary model of a natural vibration mode.
Figure 4B:
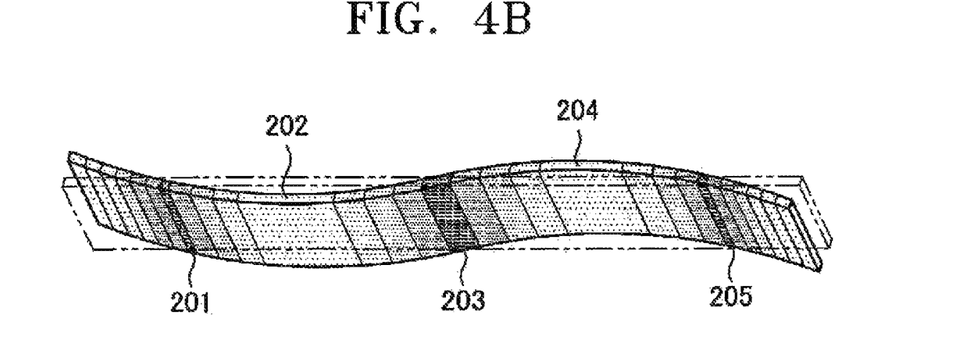
FIG. 4B is a pictorial diagram illustrating another exemplary model of a natural vibration mode.

Hereinafter, a removing operation of foreign substances using the foreign substance-removing unit 120, according to an embodiment of the present invention, will be described with reference to FIGS. 3 and 4A. FIG. 3 is a graph showing a relationship between a frequency of a control signal for vibrating the piezoelectric elements 123 and 124 and impedance. FIGS. 4A and 4B illustrate models of examples of a natural vibration mode.

Removal of Foreign Substances by Using the Foreign Substance Unit 120

In the photographing apparatus 100 according to the current embodiment of the present invention, two different control signals are respectively input to the piezoelectric elements 123 and 124 of the foreign substance-removing unit 120, thereby effectively vibrating the vibration member 121.

Vibration of the piezoelectric elements 123 and 124 varies according to a frequency of an input control signal, and the vibration state for vibrating the vibration member 121 also varies according to the varied vibration of the piezoelectric elements 123 and 124. That is, a portion of the vibration member 121, which hardly vibrates during the vibration of the piezoelectric elements 123 and 124 according to a first control signal, may be vibrated by inputting a second control signal that is different from the first control signal.

Referring to FIG. 3, the higher the frequency of control signals input to the piezoelectric elements 123 and 124, the lower the impedance.

However, a resonance in which impedance is suddenly increased at a predetermined frequency is generated (natural vibration mode). For example, in the natural vibration mode illustrated in FIG. 4A, resonance is generated such that two nodes 201 and 203 where the vibration member 121 hardly shifts and one anti-node 202 where the vibration member 121 greatly shifts from an initial state (non-vibration state), illustrated by a two-point broken line, exists. Also, in the natural vibration mode illustrated in FIG. 4B, a resonance is generated such that three nodes 201, 203, and 205 where the vibration member 121 hardly shifts and two anti-nodes 202 and 204 where the vibration member 121 greatly shifts from an initial state (non-vibration state), illustrated by a two-point broken line, exist.

Vibration shifting of the piezoelectric elements 123 and 124 in a state other than the resonance is very small. Accordingly, by generating the resonance as illustrated in FIG. 4A or 4B to further vibrate the vibration member 121, the removal effect of foreign substances can be increased.

Also, the foreign substance-removing unit 120 according to the current embodiment of the present invention inputs two different control signals respectively to the piezoelectric elements 123 and 124 such that input times of the control signals are overlapped, in order to prevent decrease in the removal effect of foreign substances in nodes of the vibration member 121 in the natural vibration mode.

That is, when the vibration member 121 is vibrated by inputting one control signal to the piezoelectric elements 123 and 124, the vibration member 121 has a portion where shifting by vibration is large (anti-node) and a portion where shifting by vibration is small (node). For example, when a control signal of a frequency that generates the resonance as illustrated in FIG. 4A is input to the piezoelectric elements 123 and 124, the vibration member 121 hardly moves at the nodes 201 and 203 of the vibration member 121. Thus, it is difficult to remove foreign substances attached to the nodes 201 and 203 of the vibration member 121.

Thus, by generating a vibration mode not having a node by inputting two different control signals respectively to the piezoelectric elements 123 and 124, all areas of the vibration member 121 are vibrated. The two different control signals may be of frequencies that generate different natural vibration modes. Also, the nodes of the two control signals may preferably not overlap, and non-vibrating portions of the vibration member 121 may preferably not overlap. Thus, the removal efficiency of foreign substances of the foreign substance-removing unit 120 may be further increased.

In addition, the time required for removing foreign substances can be reduced by inputting different control signals to the piezoelectric elements 123 and 124, respectively, such that the inputting of the control signals is performed at the same time. In the photographing apparatus 100 according to the current embodiment, when removing the foreign substances attached to the vibration member 121, the piezoelectric element driving control unit 160 inputs a control signal of a predetermined frequency to the piezoelectric elements 123 and 124 according to an instruction to start removing foreign substances that is transmitted from the camera control unit 150.

For example, the piezoelectric element driving control unit 160 inputs a control signal of a frequency f1 to the piezoelectric element 123 and at the same time, a control signal of a frequency f2 to the piezoelectric element 124. Compared to when a control signal of a frequency f1 or a frequency f2 is input to one of the piezoelectric elements 123 and 124 and then a control signal of a frequency f1 or a frequency f2 is input to the other of the piezoelectric elements 123 and 124, the time required for removing foreign substances can be reduced by overlapping the input times of control signals of the different frequencies f1 and f2.

Also, in the photographing apparatus 100 according to the current embodiment, the time required for removing foreign substances can be reduced by overlapping the input times of control signals of the different frequencies f1 and f2, compared to when a control signal of a frequency f1 or a frequency f2 is input to both the piezoelectric elements 123 and 124 and then a control signal of a frequency f1 or a frequency f2 is input to the other of both the piezoelectric elements 123 and 124.

Also, in the photographing apparatus 100 according to the current embodiment, the control signal input to the piezoelectric elements 123 and 124 is determined in advance according to the characteristics of the piezoelectric elements 123 and 124, and thus a frequency of a control signal being input to the piezoelectric elements 123 and 124 needs not be searched. Accordingly, since the piezoelectric elements 123 and 124 do not have to be vibrated at a frequency where the removal effect of foreign substances is small, the consumption power for removing foreign substances can be reduced.

Figure 5:
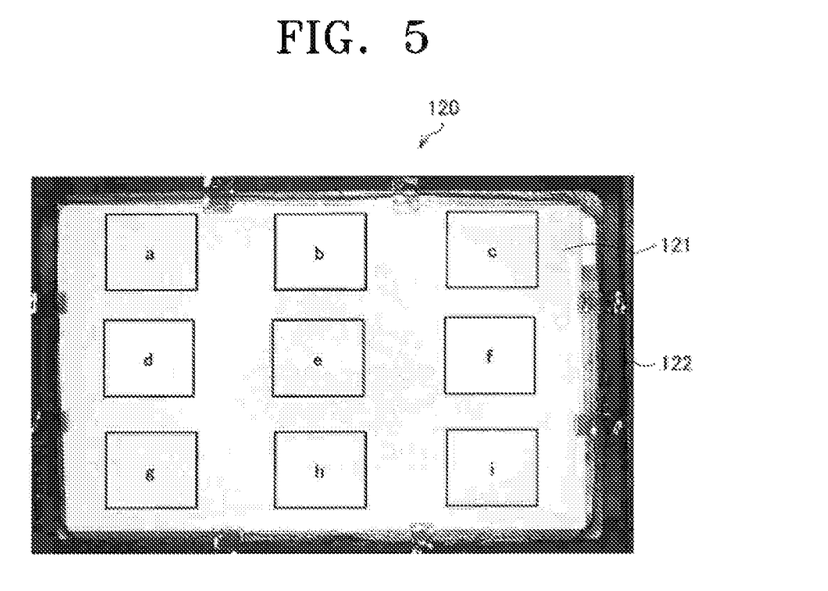
FIG. 5 is a photographic image showing divided areas of a vibration member of the foreign substance-removing unit of FIG. 2.

The operation of removing foreign substances by using the foreign substance-removing unit 120 according to the current embodiment has been described above. The removal effect of foreign substances of the foreign substance-removing unit 120 is verified using experimental results to be described hereinafter with reference to FIGS. 5, 6A through 6D, 7A through 7D, and 8A through 8C. FIG. 5 is a photographic image showing divided areas of the vibration member 121 of the foreign substance-removing unit 120 of FIG. 1. FIGS. 6A through 6D are photographic images of the vibration member 121 from which foreign substances are removed when a control signal of a frequency was applied to the piezoelectric elements 123 and 124. FIGS. 7A through 7D are photographic images of the vibration member 121 from which foreign substances are removed when control signals of different frequencies were respectively applied to the piezoelectric elements 123 and 124, respectively. FIGS. 8A through 8C are graphs showing a foreign substance-removing ratio in each of the areas of the vibration member 121.

Verification of the Foreign Substance Removal Effect

According to the current experiment, the foreign substance-removing ratio of the vibration member 121 was measured both when a control signal of one frequency is input to the piezoelectric elements 123 and 124 of the foreign substance-removing unit 120 according to the embodiment illustrated in FIG. 2, and when different controls signals of different frequencies are respectively input to the piezoelectric elements 123 and 124, to verify the foreign substance removal effect.

In detail, fifteen types of JIS Z 8901 experimental powder (mixed powder: 8 types 72%+12 types 23%+cotton linter 5%) were diffusively sprayed on a dust removal filter, which is the vibration member 121 disposed on an imaging plane side of the imaging device 130.

The removal ratio of foreign substances was calculated by respectively measuring the number of foreign substances in a state before vibrating the vibration member 121 (initial state) and after vibrating the vibration member 121 once, twice, and three times. Also, the removal ratio of foreign substances of nine divided areas—areas (a) through (i)—of the vibration member 121, as illustrated in FIG. 5, was measured.

First, a single vibration where a control signal of one frequency was input to the piezoelectric elements 123 and 124 of the foreign substance-removing unit 120 will be described. Here, for example, a control signal of a frequency f1 of 57.544 kHz was input to the piezoelectric elements 123 and 124.

Figure 6A:
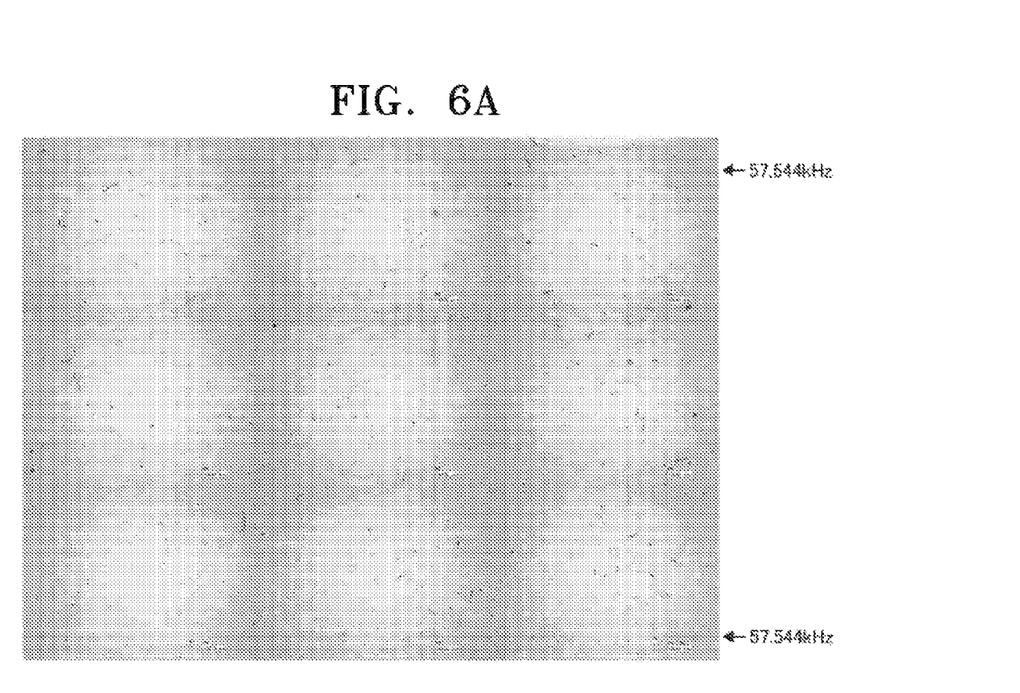
FIG. 6A is a photographic image of a vibration member from which foreign substances are removed at an initial state when a control signal of one frequency is applied to two piezoelectric elements.
Figure 6B:
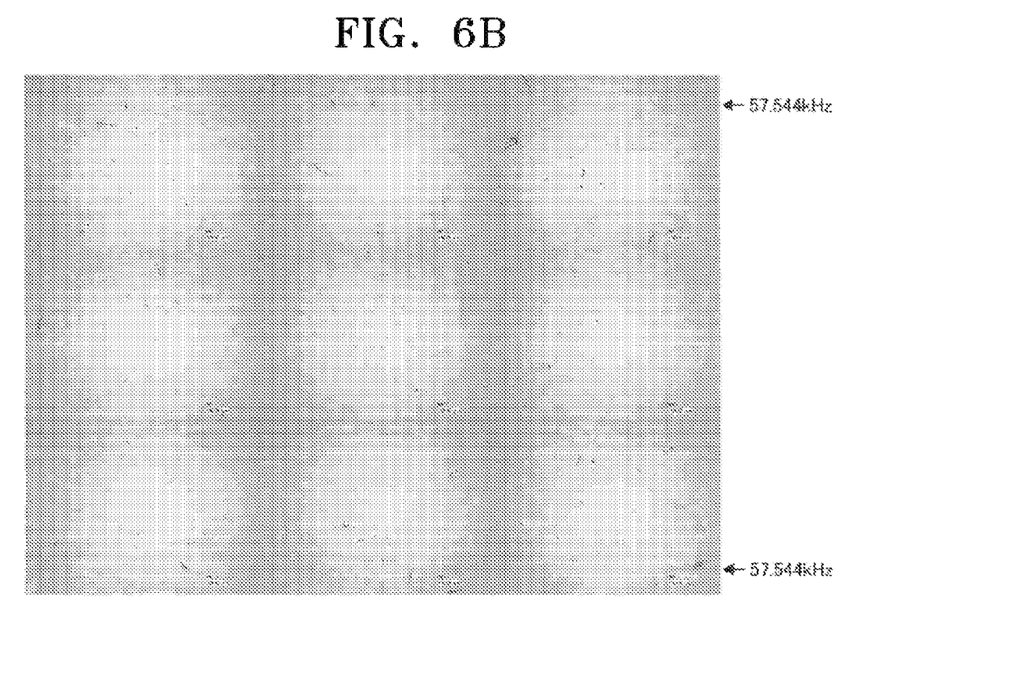
FIG. 6B is a photographic image of a vibration member from which foreign substances are removed after a first vibration when a control signal of one frequency is applied to two piezoelectric elements.

As illustrated in FIG. 6A, at the initial state, various foreign substances, small or large, were attached to each of the areas of the vibration member 121. First, when a control signal of the frequency f1 was input to the piezoelectric elements 123 and 124 for a predetermined period of time (first input), some of the foreign substances were removed from each area, as illustrated in FIG. 6B.

Figure 6C:
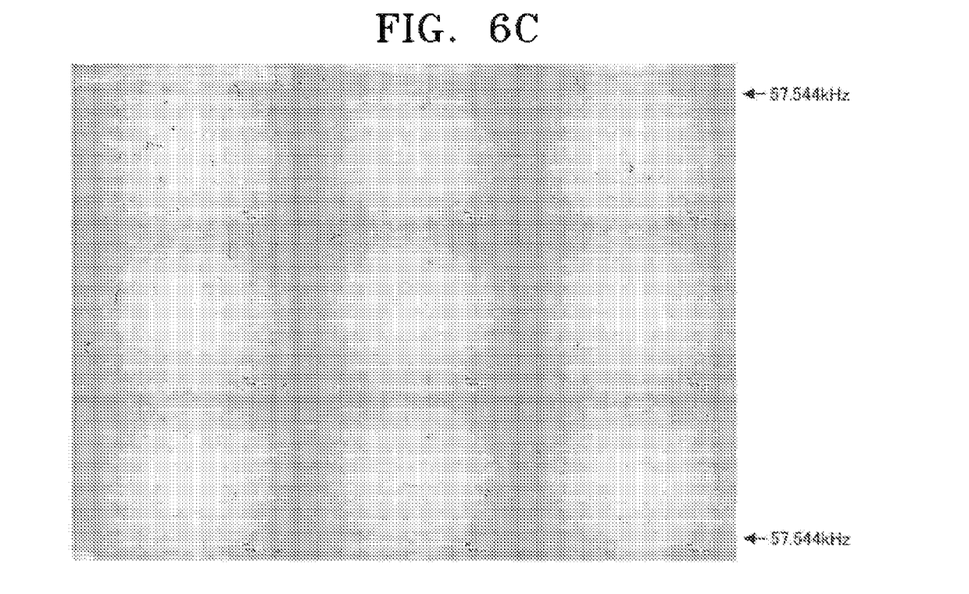
FIG. 6C is a photographic image of a vibration member from which foreign substances are removed after a second vibration when a control signal of one frequency is applied to two piezoelectric elements.
Figure 6D:
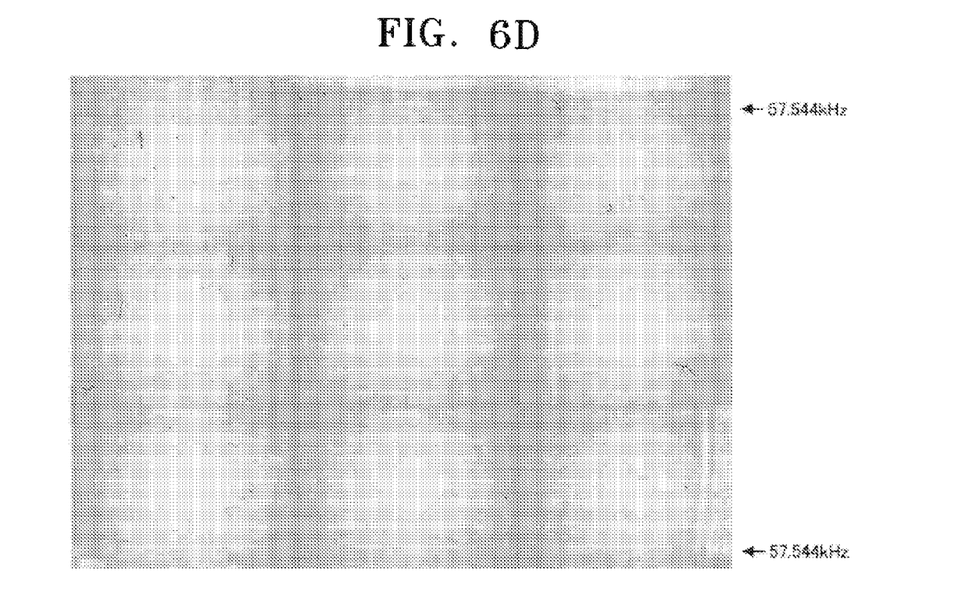
FIG. 6D is a photographic image of a vibration member from which foreign substances are removed after a third vibration when a control signal of one frequency is applied to two piezoelectric elements.

Next, when a control signal of the frequency f1 was input to the piezoelectric elements 123 and 124 for a predetermined period of time (second input), the foreign substances were further removed from each area of the vibration member 121, as illustrated in FIG. 6C. When a control signal of the frequency f1 was input to the piezoelectric elements 123 and 124 for a predetermined period of time (third input), the foreign substances were further removed from each area of the vibration member 121 as illustrated in FIG. 6D. However, as can be seen from FIG. 6D, despite repeating the operation of removing foreign substances, there are areas such as the area (a) or the area (d) where the removal effect of foreign substances is not obtained.

Hereinafter, a complex vibration where control signals of different frequencies are respectively input to the piezoelectric elements 123 and 124 of the foreign substance-removing unit 120 will be described.

In this case, for example, a control signal of a frequency f1 of 84 kHz was input to the piezoelectric element 123 and a control signal of a frequency f2 of 57.544 kHz was input to the piezoelectric element 124.

Figure 7A:
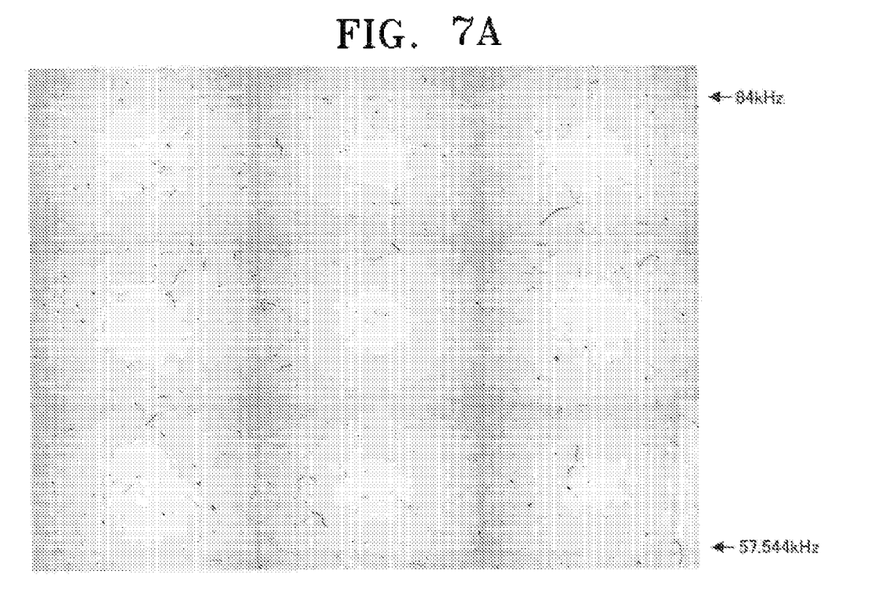
FIG. 7A is a photographic image of a vibration member from which foreign substances are removed at an initial state when control signals of different frequencies are respectively applied to two piezoelectric elements.
Figure 7B:
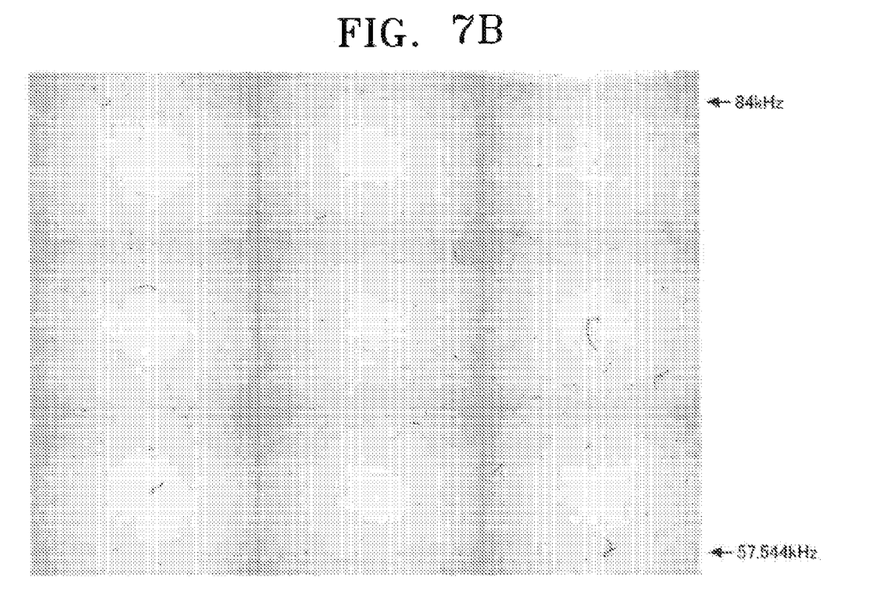
FIG. 7B is a photographic image of a vibration member from which foreign substances are removed after a first vibration when control signals of different frequencies are respectively applied to two piezoelectric elements.
Figure 8A:
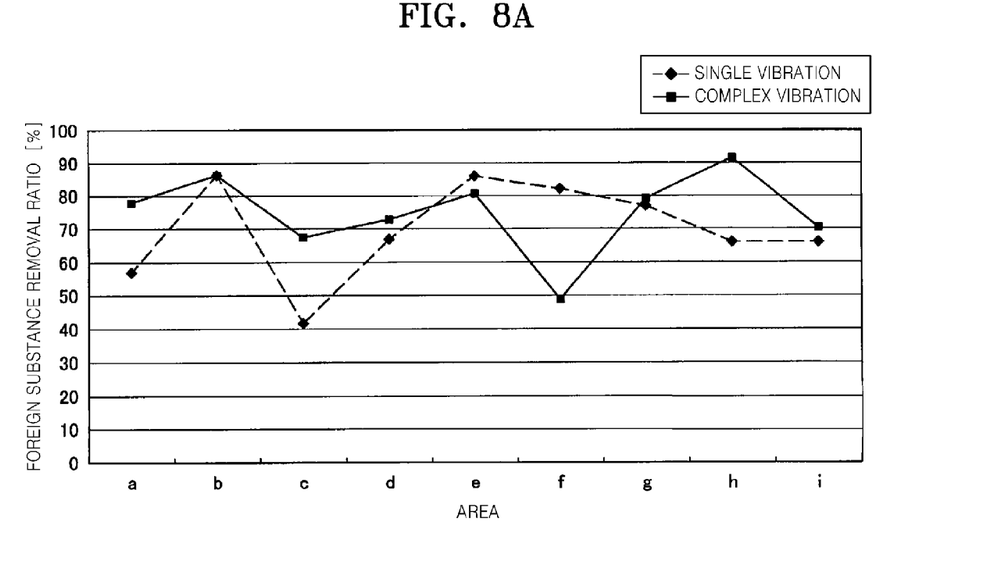
FIG. 8A is a graph showing the foreign substance removal ratio in each of the areas of a vibration member after a first vibration.
Figure 8B:
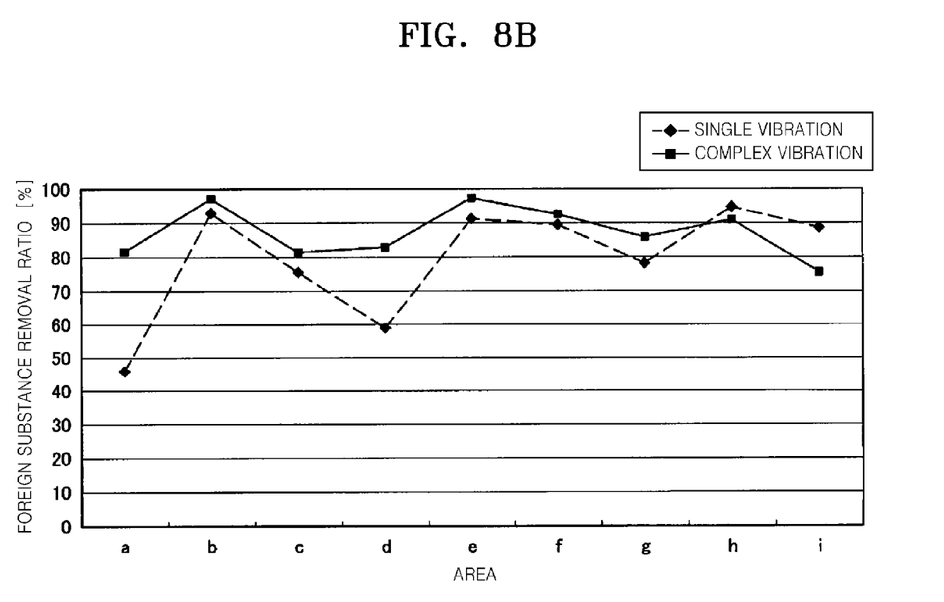
FIG. 8B is a graph showing the foreign substance removal ratio in each of the areas of a vibration member after a second vibration.
Figure 8C:
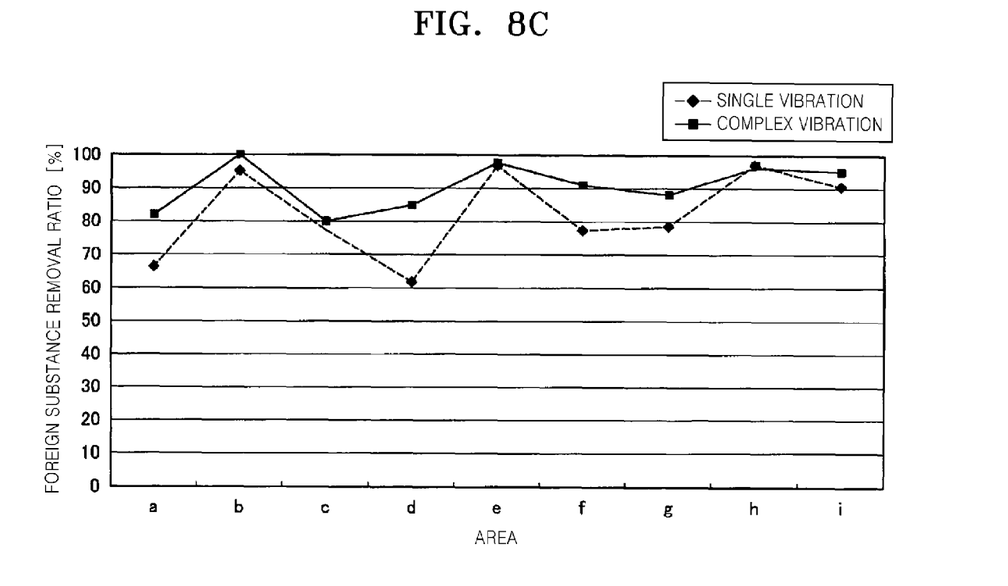
FIG. 8C is a graph showing the foreign substance removal ratio in each of the areas of a vibration member after a third vibration.

As illustrated in FIG. 7A, at the initial state, small or large foreign substances are attached to each area of the vibration member 121. First, when the control signals of the frequencies f1 and f2 were respectively input to the piezoelectric elements 123 and 124 for a predetermined period of time (first input), some of the foreign substances were removed from each of the areas of the vibration member 121, as illustrated in FIG. 7B.

Figure 7C:
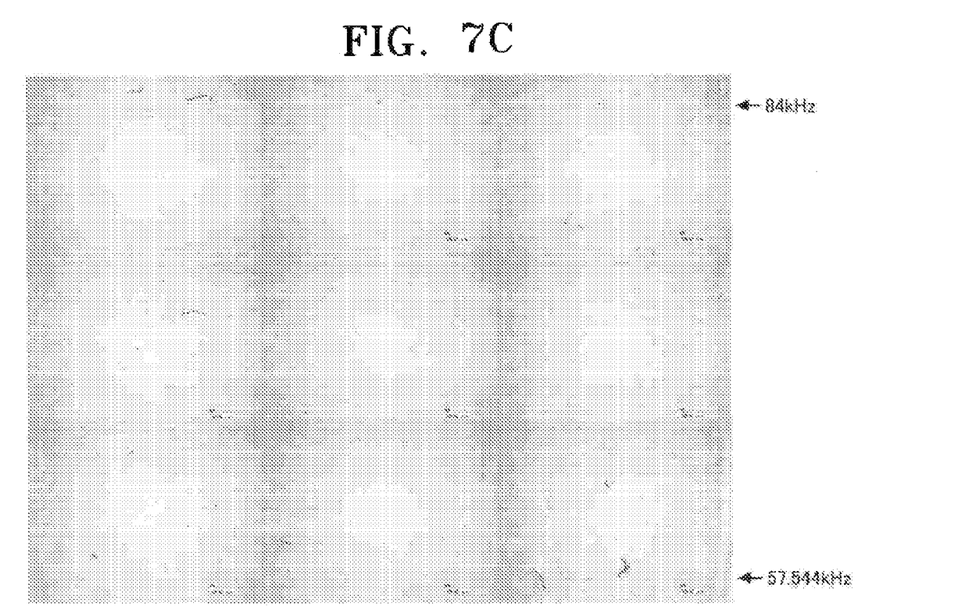
FIG. 7C is a photographic image of a vibration member from which foreign substances are removed after a second vibration when control signals of different frequencies are respectively applied to two piezoelectric elements.
Figure 7D:
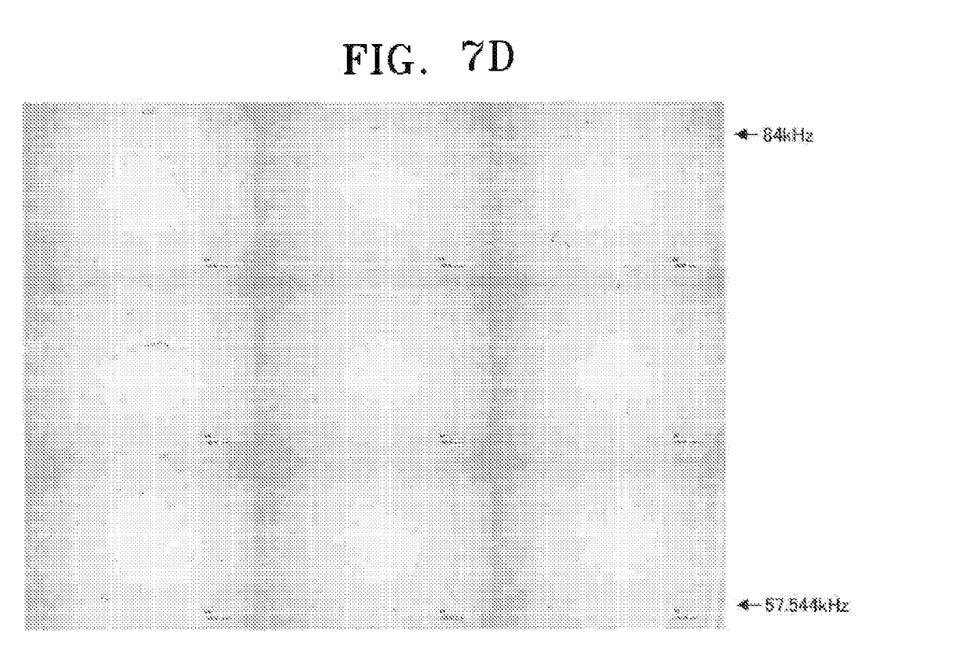
FIG. 7D is a photographic image of a vibration member from which foreign substances are removed after a third vibration when control signals of different frequencies are respectively applied to two piezoelectric elements.

Next, when control signals of the frequencies f1 and f2 were respectively input to the piezoelectric elements 123 and 124 for a predetermined period of time (second input), the foreign substances were further removed from each area of the vibration member 121, as illustrated in FIG. 7C. When control signals of the frequencies f1 and f2 were input to the piezoelectric elements 123 and 124 for a predetermined period of time (third input), the foreign substances were further removed from each area of the vibration member 121, as illustrated in FIG. 7D. While different amounts of foreign substances were attached to the areas of the vibration member 121, as illustrated in FIG. 7C, most of the foreign substances were removed, as illustrated in FIG. 7D, and thus it can be seen that a uniform foreign substance removal effect was obtained for all of the areas of the vibration member 121 by the vibration of the vibration member 121.

FIGS. 8A through 8C are graphs showing a foreign substance removal ratio of the single vibration where the control signal of one frequency, the frequency f1, was input as shown in FIGS. 6B through 6D, and a foreign substance removal ratio of the complex vibration where the control signals of the frequencies f1 and f2 were input as shown in FIGS. 7B through 7D.

As illustrated in FIG. 8A, when a first control signal was input to the piezoelectric elements 123 and 124, the removal ratio was better in some portions of the graph of the single vibration and in some portions of the graph of the complex vibration. However, when second and third control signals were respectively input to the piezoelectric elements 123 and 124, the foreign substance removal ratio of the complex vibration was higher than that of the single vibration, as illustrated in FIGS. 8B and 8C. In addition, foreign substances were removed from each area more uniformly and stably by the complex vibration than by the single vibration.

As described above, according to the current embodiment of the present invention, when control signals of the two different frequencies f1 and f2, are input, foreign substances can be removed more effectively than when a control signal of one frequency, the frequency f1, is input.

The photographing apparatus 100 including the foreign substance-removing unit 120 according to the current embodiment of the present invention has been described above.

According to the current embodiment, the two piezoelectric elements 123 and 124 that vibrate the vibration member 121 are mounted on the foreign substance-removing unit 120, and control signals of two different frequencies are respectively input to the piezoelectric elements 123 and 124. The control signals are respectively input to the piezoelectric elements 123 and 124 such that the input times thereof overlap. Accordingly, as the vibration member 121 is vibrated without non-vibrating portions, the removal effect of foreign substances can be increased by using the foreign substance-removing unit 120. Also, by overlapping the input times of the two control signals, the time required for removing foreign substances can be reduced.

Second Embodiment of the Present Invention

Figure 9:
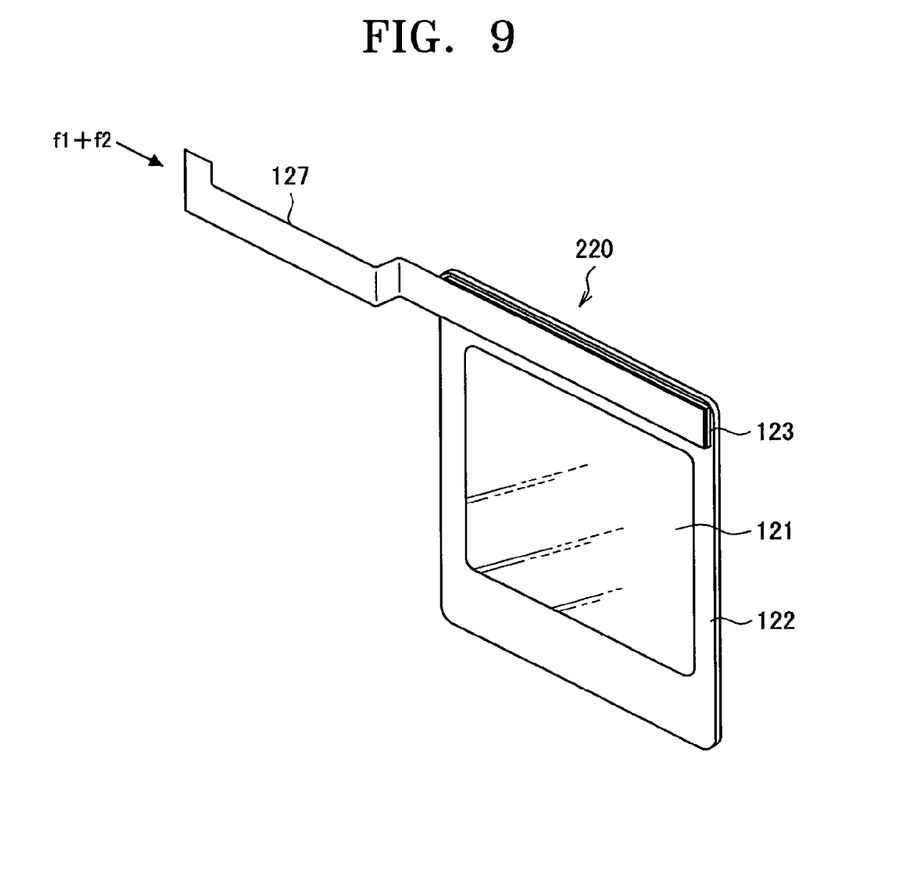
FIG. 9 is a perspective view illustrating a foreign substance-removing unit according to another embodiment of the present invention.

FIG. 9 is a perspective view illustrating a foreign substance-removing unit 220 according to another embodiment of the inventive concept. The foreign substance-removing unit 220 superimposes control signals of at least two frequencies into one control signal, and inputs the control signal to the piezoelectric element 123 to thereby vibrate the vibration member 121. In this case, the foreign substance-removing substance removing unit 120 of the photographing apparatus 100 according to the previous embodiment can be replaced with the foreign substance-removing substance removing unit 220.

Hereinafter, the foreign substance-removing unit 220 according to the current embodiment of the present invention will be described with reference to FIG. 9. A configuration of a photographing apparatus including the foreign substance-removing unit 220 is the same as the photographing apparatus 100, and thus descriptions thereof will not be provided here.

Configuration and Operation of Removing Foreign Substances of the Foreign Substance-removing Unit 220

As illustrated in FIG. 9, the foreign substance-removing unit 220 according to the current embodiment includes the vibration member 121, the piezoelectric element 123, and an FPC 127. The vibration member 121 and the piezoelectric element 123 may be the same as those of the previous embodiment. The vibration member 121 is supported by the supporting unit 122 such that a peripheral portion of the vibration member 121 is supported by the supporting unit 122, as in the previous embodiment. The piezoelectric element 123 that vibrates the vibration member 121 is disposed on the supporting unit 122. The FPC 127 that inputs a control signal for vibrating the piezoelectric element 123 is installed to the piezoelectric element 123.

The control signal transmitted from the FPC 127 to the piezoelectric element 123 is generated by superimposing control signals of at least two different frequencies. For example, the piezoelectric element driving control unit 160 superimposes the frequency f1 of the natural vibration mode illustrated in FIG. 4A and the frequency f2 of the natural vibration mode illustrated in FIG. 4B to generate one control signal $F=f1+f2$.

The control signal F is input to the piezoelectric element 123 via the FPC 127. Accordingly, complex vibration generated by combining vibration according to the control signal of the frequency f1 of the vibration member 121 and vibration according to the control signal of the frequency f2 may be generated and provided to the vibration member 121.

When inputting a control signal generated by superimposing at least two control signals like when using the foreign substance-removing unit 220 according to the current embodiment of the present invention, the foreign substance-removing unit 220 needs to include at least one piezoelectric element (here the piezoelectric element 123). When the at least one piezoelectric element is vibrated by using the control signal F generated by superimposing control signals of at least two frequencies, the vibration member 121 may be vibrated while vibration modes according to the control signals of the frequencies are synthesized. Thus, the number of components of the foreign substance-removing unit 220 can be reduced.

Also, in the current embodiment, when superimposing the frequencies to generate the control signal F, nodes of at least two superimposing control signals may preferably not overlap, and also, non-vibrating portions of the vibration member 121 may preferably not overlap. Accordingly, the removal ratio of foreign substances may be further increased by using the foreign substance-removing unit 220. Also, according to the operation of removing foreign substances by using the foreign substance-removing unit 220, the same removal effect of foreign substances as when inputting control signals of a plurality of frequencies at the same time may be obtained, and the time required for removing foreign substances may be reduced.

The scope of the invention is defined not by the detailed description of the invention but by the appended claims. For example, in the first embodiment described above, control signals of two different frequencies are input to the piezoelectric elements 123 and 124, respectively, but the present invention is not limited thereto. For example, at least three piezoelectric elements may be disposed in the foreign substance-removing unit 120, and control signals of at least three frequencies may be respectively input to the at least three piezoelectric elements. Also, as in the second embodiment described above, a control signal generated by superimposing at least two frequencies may be input to a plurality of piezoelectric elements to vibrate the vibration member 121. Here, different control signals may be input to the piezoelectric elements.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A photographing apparatus comprising:
   an imaging device comprising a converter having an output at which an electrical signal of a captured image is provided;
   a vibration member mounted at an imaging plane side of the imaging device;
   a supporting unit that supports a periphery portion of the vibration member;
   a vibration-applying unit disposed on the supporting unit for vibrating the vibration member, the vibration-applying unit comprising an input; and
   a vibration control unit having an output that provides at least two different control signals to the input of the vibration-applying unit such that input times of the control signals are overlapped;
   wherein the vibration control unit inputs to the vibration-applying unit a synthesized signal generated by combining the at least two different control signals.

2. The photographing apparatus of claim 1, wherein the vibration control unit inputs a periodic signal as the at least two control signals to the vibration-applying unit.

3. The photographing apparatus of claim 1, wherein the vibration control unit inputs to the vibration-applying unit a resonance frequency signal that resonantly vibrates the vibration member, as the at least two control signals.

4. The photographing apparatus of claim 1, wherein the vibration-applying unit is a monolithic single-piece element.

5. The photographing apparatus of claim 1, wherein the two different control signals are two different frequency control signals.

6. The photographing apparatus of claim 1, wherein the output of the vibration control unit provides the synthesized signal to a single input of the vibration-applying unit.

7. A method of removing foreign substances of a photographing apparatus, comprising:
   vibrating, with a vibration-applying unit, a vibration member that is disposed at an imaging plane side of an imaging device for converting a captured image into an electrical signal;
   inputting at least two different control signals to the vibration-applying unit such that input times of the at least two control signals are overlapped; and
   generating a synthesized signal by combining the at least two different control signals, and inputting the generated synthesized signal to the vibration-applying unit
   wherein:
   a periphery portion of the vibration member is supported by a supporting unit; and
   the vibration-applying unit is disposed on the supporting unit for vibrating the vibration member.

8. The method of claim 7, wherein the two different control signals are two different frequency control signals.

9. The method of claim 7, wherein the output of the vibration control unit provides the synthesized signal to a single input of the vibration-applying unit.

* * * * *